(12) United States Patent
Oami et al.

(10) Patent No.: US 8,509,303 B2
(45) Date of Patent: Aug. 13, 2013

(54) VIDEO DESCRIPTOR GENERATION DEVICE

(75) Inventors: Ryoma Oami, Tokyo (JP); Kota Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/990,130

(22) PCT Filed: Jan. 20, 2010

(86) PCT No.: PCT/JP2010/000275
§ 371 (c)(1),
(2), (4) Date: Oct. 28, 2010

(87) PCT Pub. No.: WO2010/084736
PCT Pub. Date: Jul. 29, 2010

(65) Prior Publication Data
US 2011/0051810 A1 Mar. 3, 2011

(30) Foreign Application Priority Data
Jan. 23, 2009 (JP) .............................. 2009-012809

(51) Int. Cl.
*H04N 7/12* (2006.01)
(52) U.S. Cl.
USPC .................................... 375/240.08
(58) Field of Classification Search
USPC .................................... 375/240.08
See application file for complete search history.

(56) References Cited

U.S. PATENT DOCUMENTS
2006/0104514 A1* 5/2006 Kasutani et al. ............ 382/190

FOREIGN PATENT DOCUMENTS

| CN | 1692373 A | 11/2005 |
|---|---|---|
| EP | 1315123 A2 | 5/2003 |
| JP | 10-320400 A | 12/1998 |
| JP | 11-338876 A | 12/1999 |
| JP | 2000222586 A | 8/2000 |
| JP | 2006-254321 A | 9/2006 |
| WO | 01/09833 A2 | 2/2001 |

OTHER PUBLICATIONS

Divakaran, A. et., al. "Video summarization using descriptors of motion activity: A motion activity based approach to key-frame extraction from video shots", Journal of Electronic Imaging vol. 10 No. 4, Oct. 2001, pp. 909-916, XP-002266028.
Office Action dated Nov. 26, 2012 issued by the State Intellectual Property Office of the People's Republic of China in counterpart Chinese Application No. 201080005314.0.

* cited by examiner

*Primary Examiner* — Richard Torrente
(74) *Attorney, Agent, or Firm* — Sughrue Mion, PLLC

(57) ABSTRACT

The video descriptor generation device includes an each-picture feature extraction unit which extracts a feature from a video for each picture which is a frame or a field, and outputs an each-picture feature; an inter-picture feature difference calculation unit which calculates an inter-picture feature difference, which is a difference between features of pictures, from the each-picture features as a difference feature, and calculates a difference feature information amount indicating an amount of information of the difference feature; an additional feature extraction unit which calculates a feature to be added as an additional feature from the video; and a feature combining unit which, if the volume of the difference feature information amount is smaller than a certain criterion, constitutes a video descriptor by incorporating the additional feature in addition to the difference feature.

17 Claims, 6 Drawing Sheets

VIDEO DESCRIPTOR GENERATION DEVICE

TECHNICAL FIELD

The present invention relates to video descriptor generation devices, video descriptor generation methods, and video descriptor generation programs, for retrieving videos, which are capable of detecting similar or identical moving image segments among a plurality of moving images.

BACKGROUND ART

An example of a video descriptor generation device is disclosed in Patent Document 1. FIG. 6 is a block diagram showing a video descriptor generation device described in Patent Document 1.

An each-frame feature extraction unit 1000 calculates a frame unit feature from an input video, and outputs it to a feature table creation unit 1010. The feature table creation unit 1010 creates a feature table from the frame unit feature output from the each-frame feature extraction unit 1000, and outputs the feature table as a video descriptor.

Next, operation of the device shown in FIG. 6 will be described.

The each-frame feature extraction unit 1000 performs a process of extracting a feature such as a color of each frame from an input video, and outputs the obtained feature to the feature table creation unit 1010 as a frame unit feature.

The feature table creation unit 1010 performed processing on variations in the feature between frames using a threshold, and compresses the feature in a time direction. Specifically, the feature table creation unit 1010 calculates a difference between the frame unit features of frames, and determines whether or not the difference is within a certain allowable variation range. Then, the feature table creation unit 1010 divides the video into time segments in which the video is within the allowable variation range, and for each of the divided time segments, a set of the feature and the time segment length (number of frames) is output as a video descriptor.

As such, the feature of the video obtained in a frame unit can be compressed in a time direction, whereby the feature size can be reduced. Further, high-speed matching can also be realized.

PRIOR ART DOCUMENT

Patent Document

Patent Document 1: Japanese Unexamined Patent Publication No. 10-320400

SUMMARY OF THE INVENTION

Problems to be Solved by the Invention

However, the above system involves a problem that performance is low in scenes having less temporal changes (motions), because if variations between the features of the frames are within an allowable range, differences in the features between respective frames are disregarded and a representative value of the segment is used. As such, in scenes of less temporal changes, the features are rounded to the same feature, so that performance is low in such scenes when performing retrieval of moving images.

Object of the Invention

An object of the present invention is to provide a video descriptor generation device capable of solving a problem of low discrimination capability of a video descriptor generated from moving images of less temporal changes (motions).

Means for Solving the Problems

According to an aspect of the present invention, a video descriptor generation device includes an each-picture feature extraction unit which extracts a feature from a video for each picture which is a frame or a field, and outputs an each-picture feature; an inter-picture feature difference calculation unit which calculates an inter-picture feature difference, which is a difference between features of pictures, from the each-picture features as a difference feature, and calculates a difference feature information amount indicating an amount of information of the difference feature; an additional feature extraction unit which calculates a feature to be added as an additional feature from the video; and a feature combining unit which, if the volume of the difference feature information amount is smaller than a certain criterion, constitutes a video descriptor by incorporating the additional feature in addition to the difference feature.

Effects of the Invention

As the present invention is configured as described above, the present invention is able to achieve an advantageous effect of improving the discrimination capability of a video descriptor generated from moving images having less temporal changes (motions).

DESCRIPTION OF EMBODIMENTS

Next, embodiments of the present invention will be described in detail with reference to the drawings.

Figure 1:
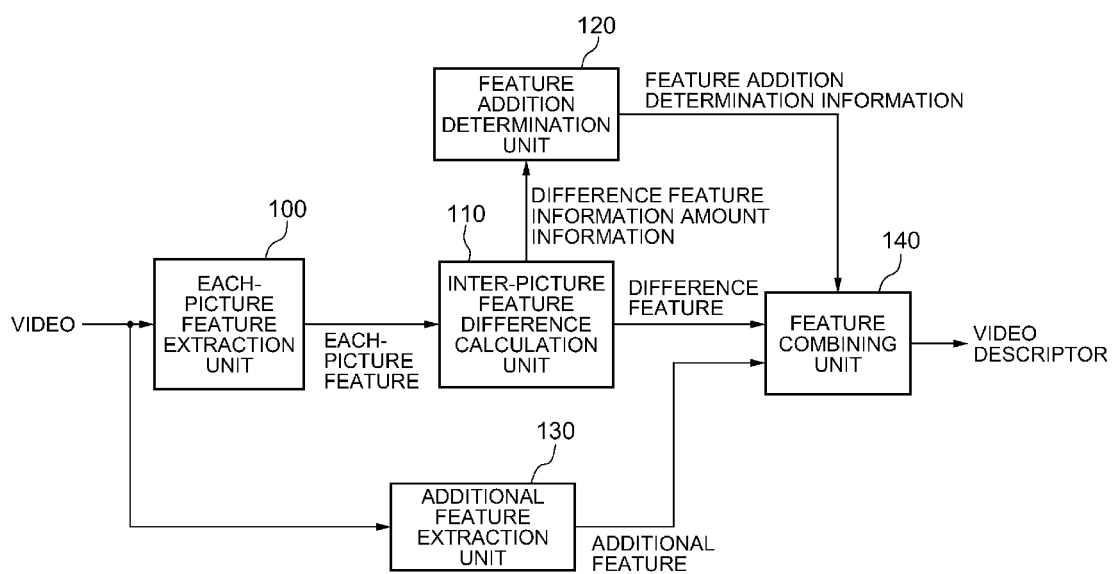
FIG. 1 is a block diagram showing the configuration of a first embodiment of the present invention.

Referring to FIG. 1, a video descriptor generation device according to a first embodiment of the present invention includes an each-picture feature extraction unit 100, an inter-picture feature difference calculation unit 110, a feature addition determination unit 120, an additional feature extraction unit 130, and a feature combining unit 140.

The each-picture feature extraction unit 100 calculates a feature of each picture from an input video, and outputs the each-picture feature to the inter-picture feature difference calculation unit 110. The inter-picture feature difference calculation unit 110 generates a difference feature from the each-picture features output from the each-picture feature extraction unit 100 and outputs the difference feature to the feature combining unit 140, and also outputs information (referred to as difference feature information amount information) describing the amount of information of the difference feature (referred to as difference feature information amount) to the feature addition determination unit 120. The feature addition determination unit 120 determines necessity of adding a feature according to the difference feature information amount information output from the inter-picture feature difference calculation unit 110, and if addition of a feature is necessary, outputs feature addition determination information to the feature combining unit 140. The additional feature extraction unit 130 calculates an additional feature which is a feature to be added from the video, and outputs it to the feature combining unit 140. The feature combining unit 140 combines the difference feature output from the inter-picture feature difference calculation unit 110 and the additional feature output from the additional feature extraction unit 130 based on the feature addition determination information output from the feature addition determination unit 120, and outputs a video descriptor.

Next, operation of the first embodiment shown in FIG. 1 will be described in detail.

First, a video is input to the each-picture feature extraction unit 100. If the original video is coded, the video is first decoded by a decoder, and then the data is input in picture units composed of frames or fields.

The each-picture feature extraction unit 100 calculates a feature vector of each picture. The each-picture feature extraction unit 100 considers a picture as one still image, and extracts a vector of a visual feature indicating features such as colors, patterns, shapes, and the like of this picture. The calculated feature vector is output to the inter-picture feature difference calculation unit 110 as an each-picture feature.

This feature may be any visual feature if it indicates features such as colors, patterns, shapes, and the like in a picture unit. For example, the visual features described in MPEG-7, Part 3, such as color layout and edge histogram, may be used for this purpose.

The inter-picture feature difference calculation unit 110 calculates a difference between features indicating the features of respective input pictures. This means that the inter-picture feature difference calculation unit 110 calculates a difference between feature vectors of pictures temporally adjacent to each other, to thereby obtain a difference feature vector. Then, the inter-picture feature difference calculation unit 110 calculates the amount of information required for describing the difference feature vector, as a difference feature information amount. The details of the operation of the inter-picture feature difference calculation unit 110 will be described below.

The calculated difference feature is output to the feature combining unit 140. On the other hand, the difference feature information amount information describing the difference feature information amount is output to the feature addition determination unit 120.

The feature addition determination unit 120 determines whether or not it is necessary to add a feature, based on the difference feature information amount information output from the inter-picture feature difference extraction unit 110, and outputs feature addition determination information. Specifically, if the difference feature information amount described by the difference feature information amount information is within a certain threshold, as it is determined that a difference between pictures is small so that the dynamism of the scene is small, the feature addition determination unit 120 outputs information indicating a signal of addition of a feature, as feature addition determination information. However, if determination is made only with a difference feature information amount between a pair of continuous pictures, a feature is determined to be added even when, by coincidence, there is only one picture in which a difference from the previous picture is small. In order to avoid such a situation, it is acceptable that information indicating a signal of addition of a feature may be output as feature addition determination information only when a state where difference feature information amount is small continues for a certain number (three pictures or more) of continuous pictures. In that case, signaling of addition of a feature may be performed from the first picture in which the difference feature information amount becomes small, or performed from the picture in which the determination is performed. The feature addition determination information indicating the determination result is output to the feature combining unit 140.

On the other hand, the additional feature extraction unit 130 extracts an additional feature from the input video. An additional feature may be a feature, which is extracted in more detail, of the same type as that of the feature extracted by the each-picture feature extraction unit 100, or a completely different feature. An example of the former is that the each-picture feature extraction unit 100 extracts an edge feature in larger block units and the additional feature extraction unit 130 extracts the edge feature in smaller block units. An example of the latter is that the each-picture feature extraction unit 100 extracts a color feature and the additional feature extraction unit 130 extracts an edge feature. Alternatively, the feature extracted by the additional feature extraction unit 130 may not be a feature calculated for each picture. For example, it is acceptable to perform a motion estimation between pictures and the amount of motion between the pictures may be used as a feature, or to calculate the amount of motion between pictures for a plurality of continuous pictures and calculate a feature by applying statistical processing thereto. The additional feature, calculated in this way, is output to the feature combining nit 140.

The feature combining unit 140 combines the difference feature output from the inter-picture feature difference extraction unit 110 and the additional feature output from the additional feature extraction unit 130 based on the feature addition determination information output from the feature addition determination unit 120, to thereby generate a video descriptor. The feature combining unit 140 is adapted to add an additional feature to the video descriptor only when the feature addition determination information signals to add the feature, while in other cases, add only the difference feature to the video descriptor. When adding the additional feature or the difference feature, the feature combining unit 140 encodes either feature to generate the video descriptor. For coding the difference feature, various difference coding systems, which will be described below in the description of the inter-picture feature difference calculation unit 110, may be used. Even for the additional feature, if generation of values of the feature is biased, the size of the descriptor can be reduced by using entropy coding such as Huffman coding, arithmetic coding, or the like.

Next, an embodiment of the inter-picture feature difference calculation unit 110 will be described with reference to FIG. 3.

Figure 3:
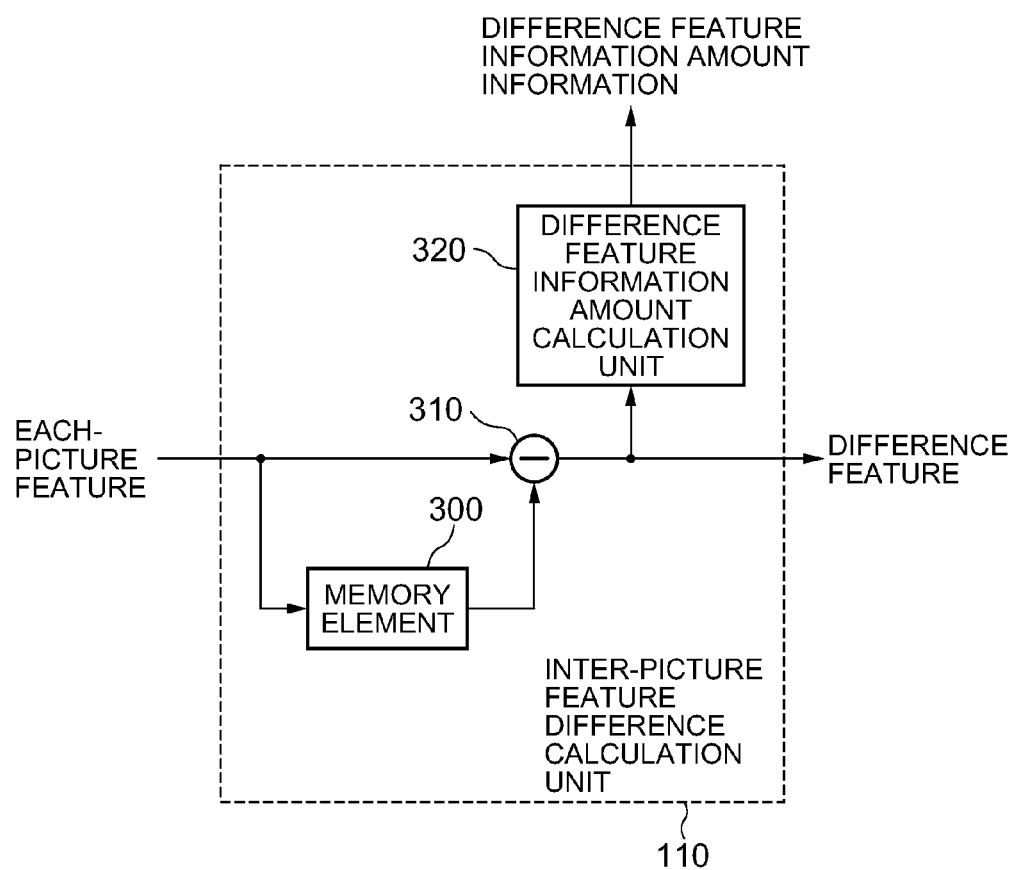
FIG. 3 is a block diagram showing the configuration of an embodiment of an inter-picture feature difference calculation unit 110.

Referring to FIG. 3, the embodiment of the inter-picture feature difference calculation unit 110 includes a memory element 300, a subtracter 310, and a difference feature information amount calculation unit 320.

The memory element 300 stores each-picture features, input thereto, for one picture, and outputs the stored each-picture feature to the subtracter 310 as a reference picture feature. The subtracter 310 subtracts the reference picture feature output from the memory element 300 from the input each-picture feature, and outputs a difference feature. The difference feature information amount calculation unit 320 receives the difference feature output from the subtracter 310, and outputs difference feature information amount information.

Next, operation of the inter-picture feature difference calculation unit 110 shown in FIG. 3 will be described.

The memory element 300 stores an each-picture feature of the previous picture, and for calculating a difference, outputs the each-picture feature to the subtracter 310 as a reference picture feature. The subtracter 310 subtracts the reference picture feature from the input each-picture feature to obtain a difference feature. Specifically, a difference feature is calculated from the following Expression 1:

$$D(t)=V(t)-V(t-T)$$ [Expression 1]

where a feature vector at time t is V(t), a time interval between pictures is T, and a difference vector is D(t).

After calculating the difference vector D(t), the feature in the memory element 300 is overwritten by the each-picture feature of the current time. This feature is used as a reference picture feature when calculating a difference feature of the time t+T.

The calculated difference feature D(t) is also input to the difference feature information amount calculation unit 320. The difference feature information amount calculation unit 320 estimates the amount of information of the difference feature (that is, difference feature information amount) from the value of the difference feature vector D(t), calculates information for describing it (that is, difference feature information amount information), and outputs the information. It should be noted that the difference feature information amount information may be a generated code amount which is estimated in the case of assuming that the difference feature vector D(t) is actually applied with difference coding. Alternatively, the difference feature information amount information may be one which is not the generated code amount itself but an amount having large correlation with the volume of the code amount, such as the number of elements of the feature vector in which a difference is generated in the difference feature vector D(t) and its difference amount, or an observed value of the code amount which is calculated by actually applying difference coding. In that case, any method may be used for difference coding. For example, it is possible to calculate probability of occurrence of a difference value for each dimension of the feature vector using learning data beforehand, and by using the probability, perform difference coding by Huffman coding or arithmetic coding. It is also possible to encode a difference value of only an element (dimension) in which a difference is generated in the feature vector, together with an index of the element.

Next, another embodiment of the inter-picture feature difference calculation unit 110 will be described with reference to FIG. 4.

Figure 4:
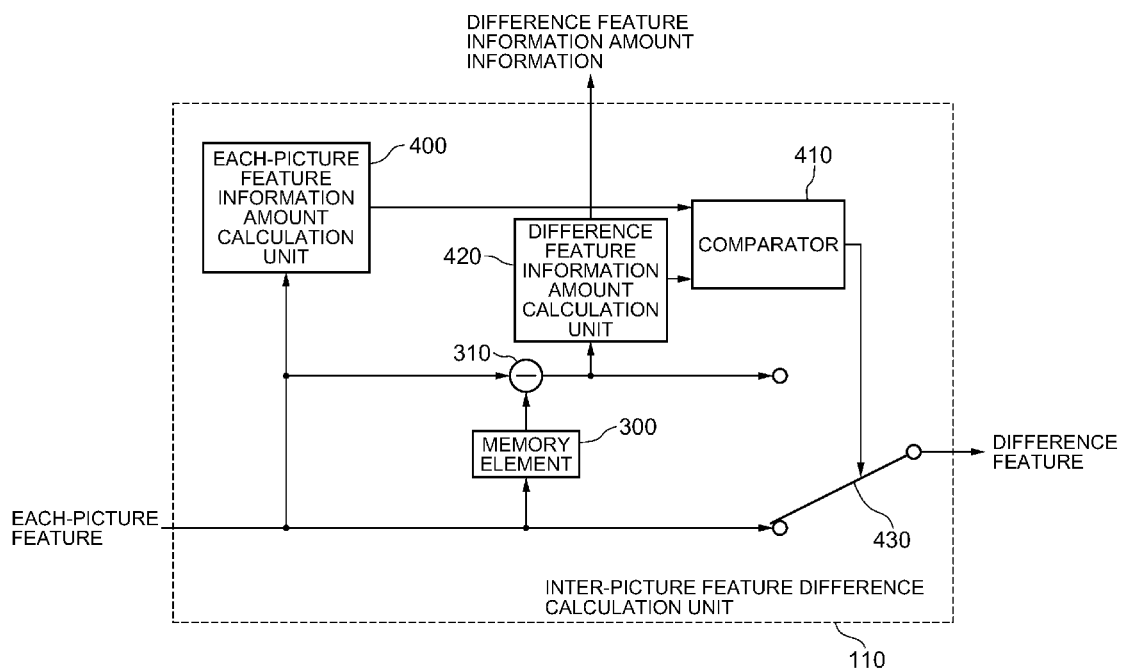
FIG. 4 is a block diagram showing the configuration of another embodiment of the inter-picture feature difference calculation unit 110.

Referring to FIG. 4, the embodiment of the inter-picture feature difference calculation unit 110 includes the memory element 300, the subtracter 310, an each-picture feature information amount calculation unit 400, a comparator 410, a difference feature information amount calculation unit 420, and a switch 430.

The connecting relationship between the memory element 300 and the subtracter 310 is the same as that of the inter-picture feature difference calculation unit 110 shown in FIG. 3. The each-picture feature information amount calculation unit 400 receives an each-picture feature, and outputs the amount of information of the each-picture feature (referred to as each-picture feature information amount) to the comparator 410. The difference feature information amount calculation unit 420 receives a difference feature output from the subtracter 310 and outputs a difference feature information amount to the comparator 410, and also outputs difference feature information amount information. The comparator 410 compares the each-picture feature information amount output from the each-picture feature information calculation unit 400 with the difference feature information amount output from the difference feature information amount calculation unit 420, and outputs a feature selection signal to the switch 430. The switch 430 receives the each-picture feature and the difference feature output from the subtracter 310, selects either one of them based on the feature selection signal output from the comparator 410, and outputs the selected one as a difference feature.

Next, operation of the inter-picture feature difference calculation unit 110 shown in FIG. 4 will be described.

The memory element 300, the subtracter 310, the difference feature information amount calculation unit 320 are the same as those shown in FIG. 3.

The each-picture feature information calculation unit 400 estimates the amount of information of an each-picture feature (that is, each-picture feature information amount) from the value of the feature V(t). The each-picture feature may be a generated code amount estimated from the feature V(t), or an observed value of the code amount calculated by actuary performing coding. In this coding, entropy coding similar to that in the case of the above-described difference coding is applicable. Alternatively, if the generated code amount is almost constant, a fixed value may be used as the code amount, rather than relying on the value of the feature V(t). The obtained each-picture feature information amount is output to the comparator 410.

On the other hand, operation of the difference feature information amount calculation unit 420 is the same as that of the difference feature information amount calculation unit 320 shown in FIG. 3, and the difference feature information amount calculation unit 420 calculates a difference feature information amount and difference feature information amount information for describing it. The difference feature information amount calculation unit 420 differs from the difference feature information amount calculation unit 320 in that the difference feature information amount calculation unit 420 also outputs the difference feature information amount. The obtained difference feature information amount is output to the comparator 410.

The comparator 410 compares the each-picture feature information amount output from the each-picture feature information calculation unit 400 with the difference feature information amount output from the difference feature information amount calculation unit 420, selects a smaller value, and outputs a signal for controlling the switch 430. As such, if the each-picture feature information amount is smaller, the switch 430 is controlled to connect to the each-picture feature, and if the difference feature information amount is smaller, the switch 430 is controlled to connect to the difference feature information amount output from the subtracter 310.

Next, an advantageous effect of the first embodiment will be described.

As the first embodiment is adapted to insert an additional feature if a feature difference between pictures is small and so degradation of performance is expected, identification capability can be improved even in scenes lacking time directional changes, and so retrieval performance can also be improved. Further, as addition of a feature is limited to the case where a feature difference between pictures is small, performance can be improved without increasing the volume of the features beyond necessity.

Next, a second embodiment of the present invention will be described in detail with reference to the drawings.

Figure 2:
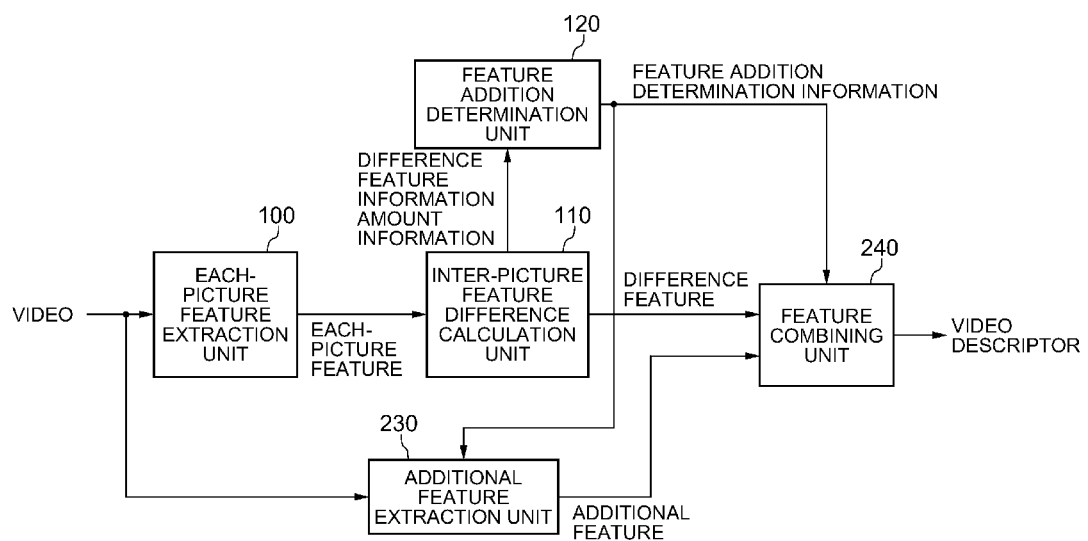
FIG. 2 is a block diagram showing the configuration of a second embodiment of the present invention.

Referring to FIG. 2, a video descriptor generation device of the second embodiment of the present invention includes the each-picture feature extraction unit 100, the inter-picture feature difference calculation unit 110, the feature addition determination unit 120, an additional feature extraction unit 230, and a feature combining unit 240.

The connecting relationship among the each-picture feature extraction unit 100, the inter-picture feature difference calculation unit 110, and the feature addition determination unit 120 is the same as that of the video descriptor generation device shown in FIG. 1. However, an output from the feature addition determination unit 120 is also input to the additional feature extraction unit 230. The additional feature extraction unit 230 extracts an additional feature from the input video based on the feature addition determination information output from the feature addition determination unit 120, and outputs the additional feature to the feature combining unit 140. The feature combining unit 240 combines the difference feature output from the inter-picture feature difference calculation unit 110 and the additional feature output from the additional feature extraction unit 230, and outputs a video descriptor.

Next, operation of the second embodiment of the present invention will be described in detail. Operations of the each-picture feature extraction unit 100, the inter-picture feature difference calculation unit 110, and the feature addition determination unit 120 are the same as those of the video descriptor generation device shown in FIG. 1.

The operation of the additional feature extraction unit 230 is also similar to the additional feature extraction unit 130 of the video descriptor generation device shown in FIG. 1, basically. However, an aspect that the additional feature extraction unit 230 operates according to the feature addition determination information output from the feature addition determination unit 120 is different. As such, the additional feature extraction unit 230 extracts an additional feature only when the feature addition determination information indicates a signal of addition of a feature, and does not extracts a feature in other cases. The extracted additional feature is output to the feature combining unit 240.

The operation of the feature combining unit 240 is also similar to that of the feature combining unit 140 of the video descriptor generation device shown in FIG. 1, basically. However, an aspect that the feature combining unit 240 combines an additional feature intermittently output from the additional feature extraction unit 230 and a difference feature to thereby generate a video descriptor is different. This combination is performed when the feature addition determination information output from the feature addition determination unit 120 indicates a signal of addition of a feature.

In the second embodiment, as calculation of an additional feature is limited to the case where an additional feature is actually required, a video descriptor can be generated more effectively.

Next, a third embodiment of the present invention will be described.

Figure 5:
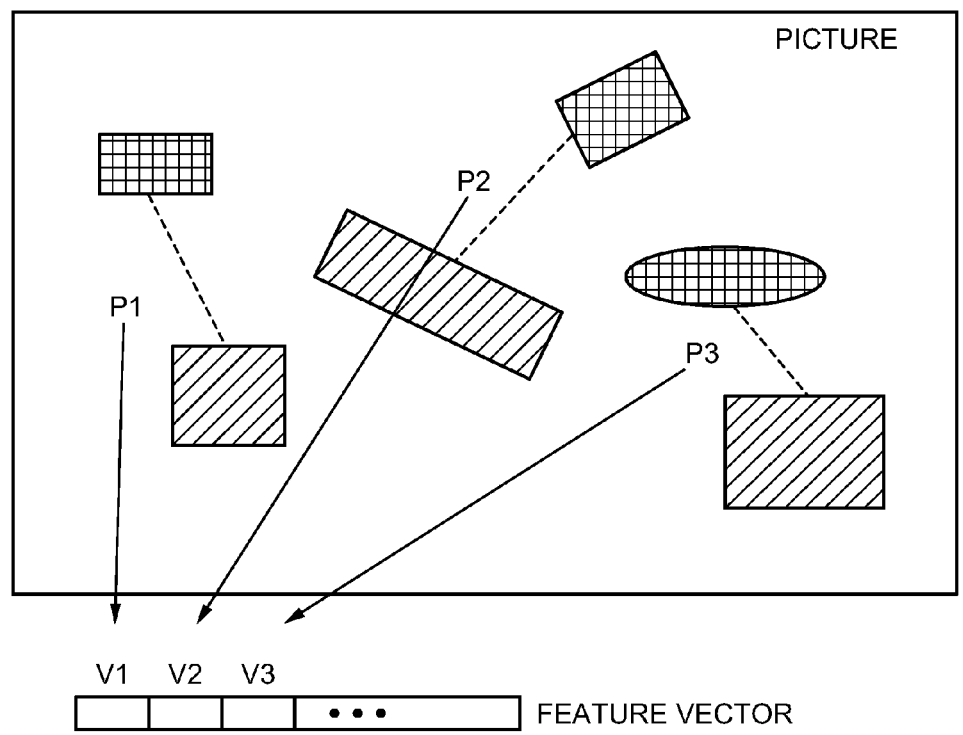
FIG. 5 is an illustration showing an example of an each-picture feature calculation method.
Figure 6:
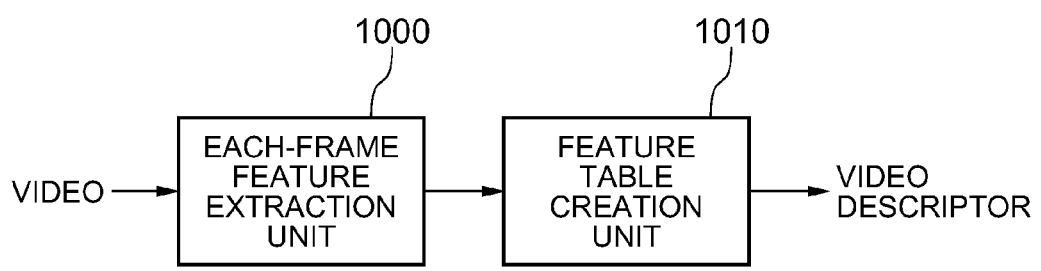
FIG. 6 is a block diagram showing the configuration of a video descriptor generation device related to the present invention.

FIG. 5 shows an exemplary method of extracting features from a picture. In this method, pairs of any two regions within a picture are set beforehand, and a difference between the features of the two regions of a pair is obtained as a feature vector. In this embodiment, respective pairs of regions are indicated as P1, P2, P3, . . . , and a feature determined from the $n^{th}$ pair is indicated as Vn. Pairs of regions may take various combinations of shapes and positions of regions, as shown in FIG. 5. Also, various methods can be used for calculating a feature Vn from the pair Pn. For example, there is a method in which an average value of luminance is calculated in each of a shaded region and a reticulated region of a pair, and a value of the feature Vn is determined from the magnitude relation thereof. Specifically, an average luminance value obtained within a reticulated region is subtracted from an average luminance value obtained within a shaded region to calculate a difference, and when the difference is positive, Vn=1, while when the difference is negative, Vn=−1. It is also possible that if the absolute value of the difference is smaller than a threshold, Vn is zero, so that the feature Vn is indicated by three values.

The each-picture feature extraction unit 100 in FIG. 1 performs the above-described processing on the N pieces of pairs, to thereby obtain feature vectors Vn in N dimensions. Next, the inter-picture feature difference calculation unit 110 calculates a difference between the feature vectors Vn of the previous picture and the current picture, and outputs the difference as a difference feature. At the same time, the inter-picture feature difference calculation unit 110 counts the number of dimensions in which a difference is other than zero among the dimensions of the difference feature, and outputs the number as difference feature information amount information. If the value of the difference feature information amount information is a predetermined threshold TH or smaller, the feature addition determination unit 120 outputs a signal of addition of a feature. On the other hand, a feature calculated by a method same as that shown in FIG. 5 may be used as an additional feature. For example, the additional feature extraction unit 130 calculates features in the same manner using M pieces of pairs which are different from those used in the each-picture feature extraction unit 100. Then, if a signal of addition of a feature is output, the feature amount combining unit 140 combines the difference feature and the additional feature to thereby generate a video descriptor. In this case, in a frame to which the additional feature is added, an M-dimensional feature is further used besides the original N-dimensional features.

In this case, although a variety of types of difference coding is applicable to the difference feature, with respect to a dimension having a value different from that of the previous picture, a method of coding the index of the dimension and the difference value in a pair may be used. If the feature vector Vn can originally take three values of −1, 0, and 1 as described above, in a state where the value of the previous picture is fixed, the number of values which may be taken as a difference is two (for example, if the value of the previous picture is 1, the difference may be −1 or −2). As such, information for distinguishing these two values can indicate the difference in 1 bit. Difference coding can be performed in this way.

Although the above example has described the case of using the same type of feature as an additional feature, the additional feature may be a different feature. For example, it is possible to calculate a motion vector between pictures and its statistical amount may be used as a feature.

While the embodiments of the present invention have been described above, the present invention is not limited to these examples. It will be understood by those of ordinary skill in the art that various changes in form and details may be made therein without departing from the scope of the present invention. For example, the inter-picture feature difference calculation unit 110 may output each-picture features, in place of difference features, to the feature combining unit 140 at certain picture cycles. A specific method of realizing it is, in the case of the inter-picture feature difference calculation unit 110 shown in FIG. 4, determining whether or not the comparator 410 outputs a signal of selecting an each-picture feature to the switch 430 within a past certain picture cycle, and if not, outputting a signal of selecting an each-picture feature to the switch 430, regardless of the result of the comparison determination. Further, in the case of the inter-picture feature difference calculation unit 110, the inter-picture feature difference calculation unit 110 may include a switch which receives an input each-picture feature and a difference feature output from the subtracter 310, and a switch control unit which outputs a control signal for selecting an input each-picture feature only once in a certain picture cycle, and outputs control signals for selecting difference features to the switch at the other times.

Further, the video descriptor generation device of the present invention is adapted such that the functions thereof can be realized by computers and programs, as well as hardware. Such a program is provided in the form of being written on a computer readable recording medium such as a magnetic disk, a semiconductor memory, or the like, is read by a computer when the computer is started for example, and controls operation of the computer, to thereby allow the computer to function as the video descriptor generation device of the above-described embodiments.

This application is based upon and claims the benefit of priority from Japanese patent application No. 2009-12809, filed on Jan. 23, 2009, the disclosure of which is incorporated herein in its entirety by reference.

INDUSTRIAL APPLICABILITY

The present invention is applicable to retrieval of similar or identical videos from various videos with high accuracy. In particular, regarding retrieval of the same segments of videos, the present invention is applicable to identification of illegally copied moving images distributed on the networks and identification of commercials distributed on actual airwaves.

REFERENCE NUMERALS 110 each-picture feature extraction unit
110 inter-picture feature difference calculation unit
120 feature addition determination unit
130 additional feature extraction unit
140 feature combining unit
230 additional feature extraction unit
240 feature combining unit
300 memory element
310 subtracter
320 difference feature information amount calculation unit
400 each-picture feature information amount calculation unit
410 comparator
420 difference feature information amount calculation unit
430 switch
1000 each-frame feature extraction unit
1010 feature table creation unit

The invention claimed is:

1. A video descriptor generation device, comprising:
an each-picture feature extraction unit that extracts a feature from a video for each picture which is a frame or a field, and outputs an each-picture feature;
an inter-picture feature difference calculation unit that calculates an inter-picture feature difference, which is a difference between features of pictures, from the each-picture features of the video as a difference feature, and calculates a difference feature information amount indicating an information amount that is necessary for describing the difference feature;
an additional feature extraction unit that calculates a feature to be added as an additional feature from the video; and
a feature combining unit that generates a video descriptor including the additional feature and the difference feature upon volume of the difference feature information amount being smaller that a certain criterion,
wherein the additional feature extraction unit calculates the additional feature only when the volume of the difference feature information amount is smaller than the certain criterion.

2. The video descriptor generation device, according to claim 1, wherein
the inter-picture feature difference calculation unit compares an each-picture feature information amount, which is an amount of information of the each-picture feature, with the difference feature information amount, and if the difference feature information amount is larger, obtains the each-picture feature as the difference feature.

3. The video descriptor generation device, according to claim 2, wherein
the each-picture feature information amount and the difference feature information amount are calculated by performing actual coding and measuring a code amount.

4. The video descriptor generation device, according to claim 1, wherein
in the certain criterion, the volume of the difference feature information amount is determined in a picture unit.

5. The video descriptor generation device, according to claim 1, wherein
in the certain criterion, the volume of the difference feature information amount is determined in a certain number of continuous pictures.

6. The video descriptor generation device, according to claim 1, wherein
the additional feature is a feature of a same type as that of the each-picture feature, and represents the each-picture feature in more detail.

7. The video descriptor generation device, according to claim 1, wherein
the additional feature is a feature of a different type from that of the each-picture feature.

8. The video descriptor generation device, according to claim 1, wherein
the inter-picture feature difference calculation unit calculates the each-picture feature as the difference feature in a certain picture cycle.

9. A video descriptor generation method, comprising:
extracting a feature from a video for each picture which is a frame or a field, and outputting an each-picture feature;
calculating an inter-picture feature difference, which is a difference between features of pictures, from the each-picture features of the video as a difference feature, and calculating a difference feature information amount indicating an information amount that is necessary for describing the difference feature;
calculating a feature to be added as an additional feature from the video; and
generating a video descriptor including the additional feature and the difference feature upon volume of the difference feature information amount being smaller that a certain criterion, wherein in the calculation of the additional feature, the additional feature is calculated only when the volume of the difference feature information amount is smaller than the certain criterion.

10. The video descriptor generation method, according to claim 9, wherein
in the calculation of the difference feature information amount, an each-picture feature information amount, which is an amount of information of the each-picture feature, is compared with the difference feature information amount, and if the difference feature information amount is larger, the each-picture feature is obtained as the difference feature.

11. The video descriptor generation method, according to claim 10, wherein
the each-picture feature information amount and the difference feature information amount are calculated by performing actual coding and measuring a code amount.

12. The video descriptor generation method, according to claim 9, wherein
in the certain criterion, the volume of the difference feature information amount is determined in a picture unit.

13. The video descriptor generation method, according to claim 9, wherein
in the certain criterion, the volume of the difference feature information amount is determined in a certain number of continuous pictures.

14. The video descriptor generation method, according to claim 9, wherein
the additional feature is a feature of a same type as that of the each-picture feature, and represents the each-picture feature in more detail.

15. The video descriptor generation method, according to claim 9, wherein
the additional feature is a feature of a different type from that of the each-picture feature.

16. The video descriptor generation method, according to claim 9, wherein
in the calculation of the difference feature information amount, the each-picture feature is calculated as the difference feature in a certain picture cycle.

17. A non-transitory computer readable medium having stored thereon a program for causing a computer to function as:
an each-picture feature extraction unit that extracts a feature from a video for each picture which is a frame or a field, and outputs an each-picture feature;
an inter-picture feature difference calculation unit that calculates an inter-picture feature difference, which is a difference between features of pictures, from the each-picture features as a difference feature, and calculates a difference feature information amount indicating an amount of information of the difference feature;
an additional feature extraction unit that calculates a feature to be added as an additional feature from the video; and
a feature combining unit that, if volume of the difference feature information amount is smaller than a certain criterion, constitutes a video descriptor by incorporating the additional feature in addition to the difference feature,
wherein the additional feature extraction unit calculates the additional feature only when the volume of the difference feature information amount is smaller than the certain criterion.

* * * * *